US006973540B2

(12) United States Patent
Moyer et al.

(10) Patent No.: US 6,973,540 B2
(45) Date of Patent: Dec. 6, 2005

(54) METHOD AND APPARATUS FOR SELECTING CACHE WAYS AVAILABLE FOR REPLACEMENT

(75) Inventors: William C. Moyer, Dripping Springs, TX (US); John J. Vaglica, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 341 days.

(21) Appl. No.: 10/627,559

(22) Filed: Jul. 25, 2003

(65) Prior Publication Data

US 2005/0021911 A1    Jan. 27, 2005

(51) Int. Cl.[7] .............................................. G06F 12/12
(52) U.S. Cl. ...................................... 711/134; 711/128
(58) Field of Search ......................... 711/128, 133–136

(56) References Cited

U.S. PATENT DOCUMENTS

| | | | | |
|---|---|---|---|---|
| 5,568,632 | A | * | 10/1996 | Nelson ........................ 711/133 |
| 6,381,676 | B2 | | 4/2002 | Aglietti et al. |
| 6,393,525 | B1 | * | 5/2002 | Wilkerson et al. ........... 711/136 |
| 6,434,671 | B2 | | 8/2002 | Chung |
| 6,640,286 | B2 | * | 10/2003 | Kawamoto et al. .......... 711/133 |
| 2003/0084247 | A1 | * | 5/2003 | Song et al. .................. 711/128 |
| 2003/0159003 | A1 | * | 8/2003 | Gaskins et al. .............. 711/128 |

FOREIGN PATENT DOCUMENTS

WO       WO 00/45269         8/2000

OTHER PUBLICATIONS

PPC440CPU Core User's Manual: Jul. 18, 2002; pp 94-97; Jul. 18, 2002: pp 94-97; IBM.

* cited by examiner

Primary Examiner—Matthew D. Anderson
(74) Attorney, Agent, or Firm—Joanna G. Chiu; Susan C. Hill (57) ABSTRACT

In a multi-way cache, a method for selecting N ways available for replacement includes providing a plurality of rulesets where each one of the plurality of rulesets specifies N ways in the cache that are available for replacement (where N is equal to or greater than zero). The method further includes receiving an access address, and using at least a portion of the access address to select one of the plurality of rulesets. The selected one of the plurality of rulesets may then be used to select N ways in that cache that are available for replacement. One embodiment uses the high order bits of the access address to select a ruleset. An alternate embodiment uses at least a portion of the access address and a ruleset selector control register to select the ruleset. Yet another embodiment uses the access address and address range comparators to select the ruleset.

19 Claims, 4 Drawing Sheets

METHOD AND APPARATUS FOR SELECTING CACHE WAYS AVAILABLE FOR REPLACEMENT

FIELD OF THE INVENTION

The present invention relates to data processing systems, and more particularly, to selective cache replacement policies within the data processing system.

RELATED ART

Lower power consumption has been gaining importance in data processing systems, due, for example, to wide spread use of portable and handheld applications. Many data processing systems today use a smaller, faster, and more efficient memory, sometimes referred to as a cache, located on the integrated circuit to reduce the number of accesses to memory (such as main memory or other internal or external memories). Accesses to cache generally consume less power and result in reduced latencies as compared to accesses to other internal or external memories. Therefore, it is desirable to store those items which will subsequently be requested again in the faster, more efficient cache in order to reduce power and increase performance.

Cache pollution occurs when information which has a lower degree of reuse replaces information which would have a higher degree of reuse if it were still present in the cache. That is, generally, items with a higher degree of reuse should remain in the cache because it is more likely that they will be requested again (e.g. requested again multiple times). For example, some information has shorter lifetimes as compared to other information, and cache pollution by this shorter lifetime information can increase power consumption and reduce performance of the cache since it is likely that the higher lifetime information will have to be refetched from the slower, less efficient internal or external memory after having been replaced by the shorter lifetime information. However, it is still desirable to allow the information with shorter lifetimes to benefit from reuse within a cache. Therefore, a need exists for an improved cache in which cache pollution is reduced so as to achieve improved power consumption and performance of the cache.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Generally, performance and power consumption of a cache can be improved by reducing cache pollution. As stated above, cache pollution occurs when information which has a lower degree of reuse replaces information which would have a higher degree of reuse if it were still present in the cache. One embodiment of the present invention reduces cache pollution by controlling placement of various types of information into the cache. For example, different types of information may have different lifetimes. For example, instructions and stack or heap data generally have longer lifetimes as compared to transient data such as multimedia, graphics, or streaming data. Other types of information may also have varying lifetimes. Information with a longer lifetime generally has a higher probability of reuse in that it is more likely that that same information will be requested again. Therefore, efficiency can be improved if, when requested, that information is already in the cache. However, if information with shorter lifetimes continuously replaces information with a longer lifetime, then on subsequent requests for that longer lifetime information, it becomes more likely that it will no longer be in the cache and thus will have to be fetched from a slower, less efficient memory. Note that it is still desirable, though, to allow the information with shorter or medium lifetimes to benefit from reuse, too. Therefore, as will be described in more detail below, different embodiments of the present invention allow for controlling placement of information into the cache in a programmable and flexible manner to allow for improved cache performance, and thus lower system power consumption.

Figure 1:
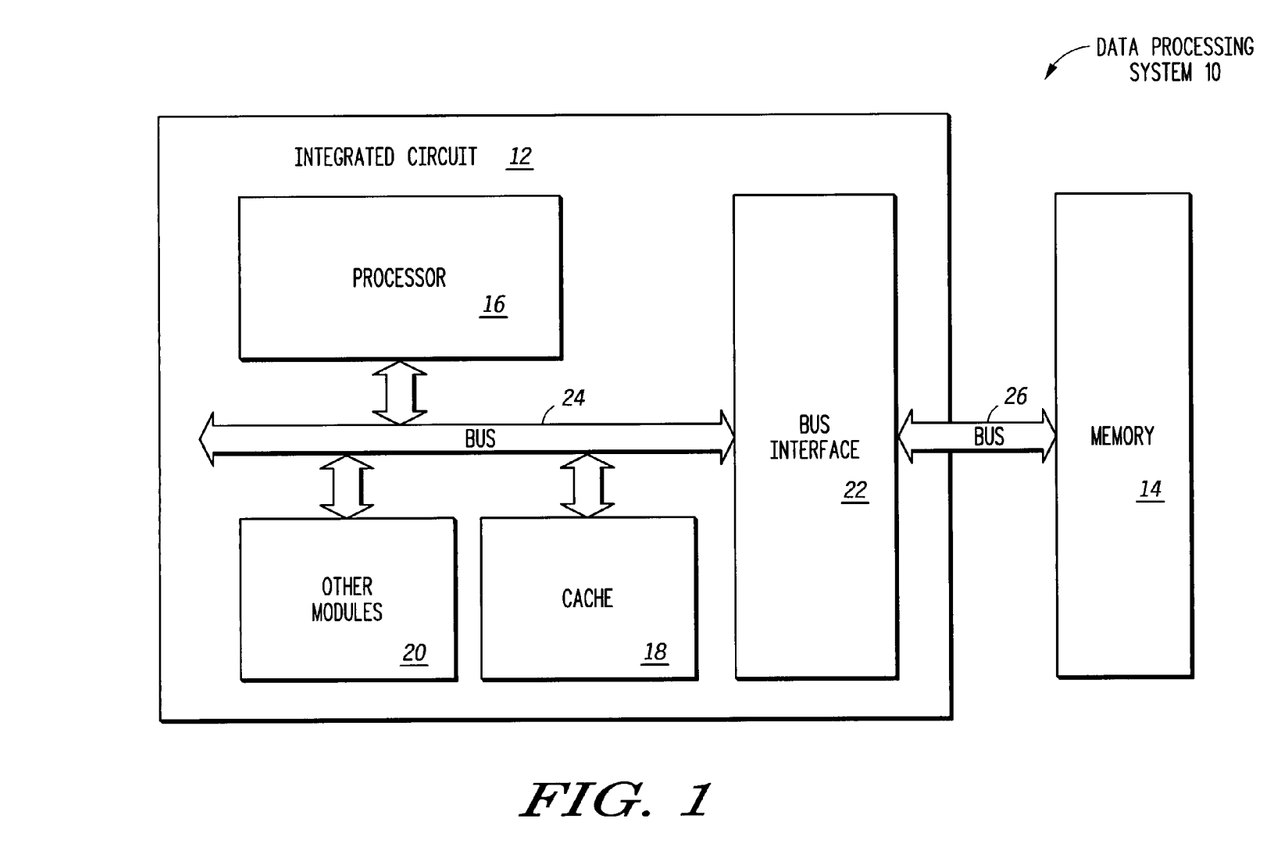
FIG. 1 illustrates, in block diagram form, a data processing system in accordance with one embodiment of the present invention.

Referring to FIG. 1, an embodiment of a data processing system 10 is illustrated. Data processing system 10 includes an integrated circuit 12, and an external memory 14. Integrated circuit 12 includes a processor 16, a cache memory 18, a bus interface 22, and other modules 20. Integrated circuit 12 also includes bus 24 and bus 26. Bus 24 couples processor 16, cache 18, bus interface 22, and other modules 20. Bus 26 couples bus interface 22 to external memory 14. While a specific exemplary embodiment of data processing system 10 has been disclosed, it is contemplated that various configurations and alternative embodiments of such a processing system could be implemented.

For example, while the cache 18 has been shown as part of integrated circuit 12, cache 18 could alternatively be disposed outside of the integrated circuit 12, such as, for example, within external memory 14. Also, note that integrated circuit 12 may include any number of processors, such as in a multi-processor data processing system, and other modules 20 may include any other peripheral devices such as, for example, other masters, slaves, or memories. Also, integrated circuitry 12 may include any number of integrated circuits such that different portions of integrated circuit 12 may be located on different integrated circuits, or, alternatively, integrated circuit 12 may be a single integrated circuit. Also, external memory 14 may be located on a same integrated circuit as integrated circuit 12, or may be located on a separate integrated circuit. Data processing system 10 will only be discussed to the extent necessary to understand the embodiments of the present invention, as will be described below in reference to FIGS. 2–5. The remaining functionality is as known in the art and thus may be implemented in a variety of different ways known in the art.

Figure 2:
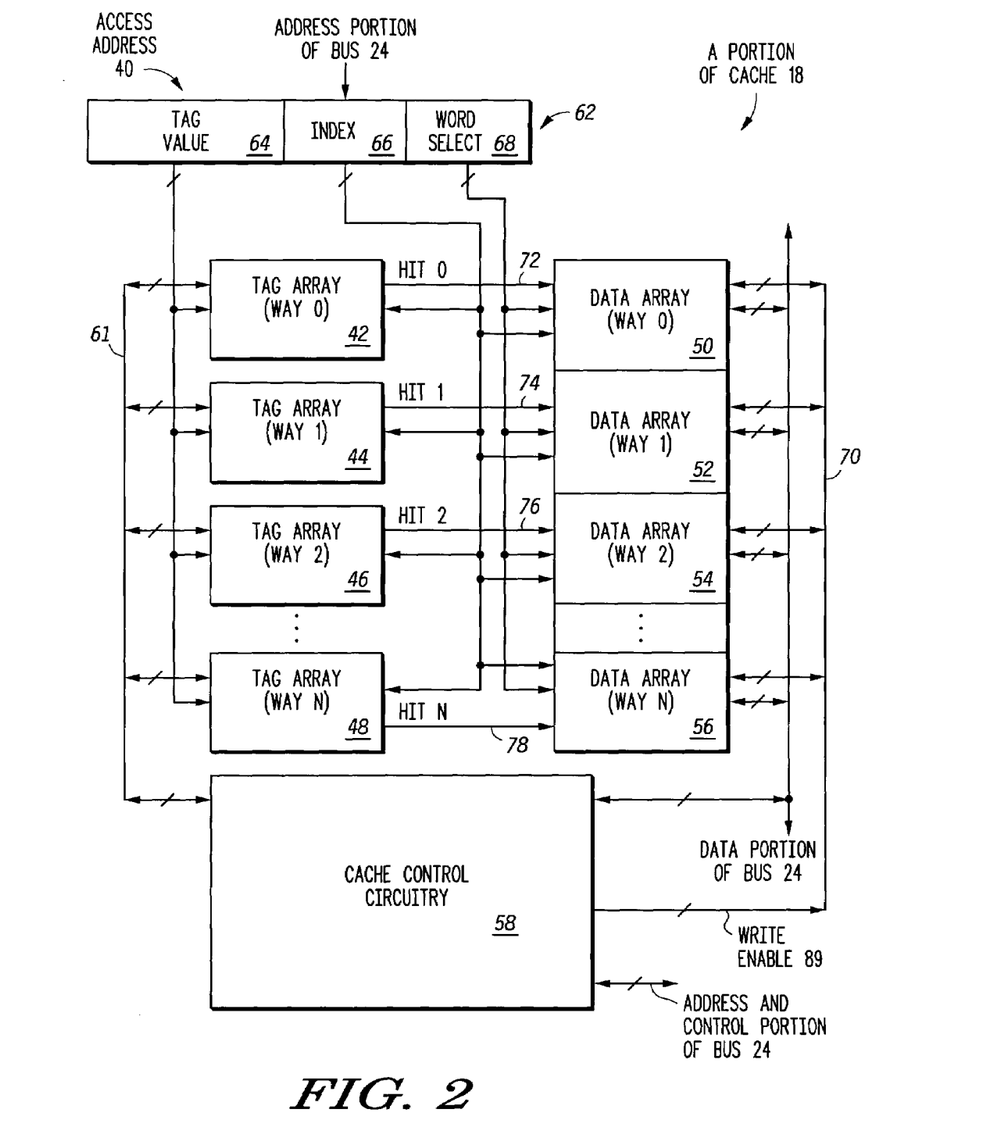
FIG. 2 illustrates, in block diagram form, a portion of the cache of FIG. 1, in accordance with one embodiment of the present invention.

Referring to FIG. 2, a particular embodiment of a portion of the cache 18 is disclosed. The portion of the cache 18 includes a register 62, tag memory array for multiple ways 42–48, data memory array for multiple ways 50–56, and cache control circuitry 58. Access address 40 is received from an address portion of bus 24 and has a tag value portion 64, an index portion 66, and a word select portion 68. For example, for a read access, access address 40 corresponds to the address of the requested information (e.g. data or instructions). In the illustrated embodiment, access address 40, when received, is stored within register 62. Tag portion 64 of access address 40 includes tag value data that is provided to the multi-way tag array 42–48. Data from the index portion 66 is provided to both the multi-way tag array 42–48 and to the multi-way data array 50–56 and is used to provide an index into the tag and data arrays. For example, in one embodiment, index portion 66 includes a set indicator to select one of a predetermined number of sets within the tag and data portions of each way. Data from the word select portion 68 is provided to the multi-way data array 50–56 such that data within a data array, such as data array (way 0) 50, is indicated by both index portion 66 and word select portion 68. That is, index portion 66 may identify one entry of data array (way 0) 50, and word select 68 then identifies a portion of that entry. The multi-way data array is also coupled to a bidirectional data portion of the bus 24 to receive and provide data from and to bus 24.

Each tag array, such as tag array (way 0) 42 provides a hit signal to a corresponding data array, such as data array (way 0) 50, based on a comparison between tag value 64 and data within tag array (way 0) 42 located with respect to index value 66. For example, in operation, tag portion 64 is compared with a value retrieved from the tag array (way 0) 42 via index portion 66 to provide hit signal 72. If the compared values result in a match, then hit signal 72 is asserted to indicate a hit. Data array (way 0) 50 includes a plurality of data blocks and is addressed by both the index value 66 and the word select value 68, and, in response to the hit, the addressed data item is output from the data array (way 0) 50 to the data portion of bus 24. If, however, the compared values do not result in a match, then hit signal 72 is not asserted, indicating a miss in that way of cache 18. If there is no match between tag value 64 and any of the tags in tag arrays 42–48, then none of hit signals 72–78 are asserted, indicating that access address 40 resulted in a miss in cache 18.

Note that FIG. 2 illustrates only one example of a portion of cache 18. However, note that in alternate embodiments, register 62, tag arrays 42–48, and data arrays 50–56 may be implemented in a variety of different ways, as known in the art, to achieve the desired functionality.

Cache control circuitry 58, as will be described in more detail below, receives at least a portion of access address 40 and determines a selected ruleset corresponding to the current access. The selected ruleset indicates which ways, if any, of way 0 to N are available for replacement. In one embodiment of the current invention, each ruleset provides a single control bit for each way in the cache, indicating whether that particular way is a candidate for replacement when that ruleset is selected. Other embodiments may use an alternate method of indicating whether a given way is to be considered as a candidate for replacement with regard to a given ruleset.

For an example of operation, in response to a read access request from a requesting device, the address of the requested information is provided to cache 18 as access address 40. If tag value 64 of access address 40 does not result in any matches within the tag arrays 42, 44, 46, and 48, then a miss occurs, as was described above. In the case of a miss, the requested information is fetched from memory such as, for example, external memory 14 or any other memory (internal or external) and is stored in the cache and provided to the requesting device in response to the read request. In one embodiment, cache control circuitry 58 selects a selected ruleset based on at least a portion of access address 40, applies the selected ruleset to determine which ways are available for receiving and storing the fetched information, selects an available way as indicated by the selected ruleset in which to store the fetched information, and determines what information currently within the selected way is to be replaced with the fetched information. Therefore, cache control circuitry provides a write enable 89 via communication path 70 to data arrays 50–56 to enable the selected way to be updated. Cache control circuitry 58 is also in communication with tag arrays 42–48 via communication path 61, and controls updating of the tag arrays as needed when selected corresponding data arrays are written. Since this functionality is well known in the art, further descriptions will focus on updates to the data arrays 50–56, and proper corresponding updates to tag arrays 42–48 will not be further described. Cache control circuitry 58 is also bidirectionally coupled to the data, address, and control portions of bus 24. Note that cache control circuitry 58 may also perform a variety of other functions, as known in the art, and therefore only those portions of cache control circuitry 58 applicable to the embodiments of FIGS. 3–5 will be described in detail herein.

Figure 3:
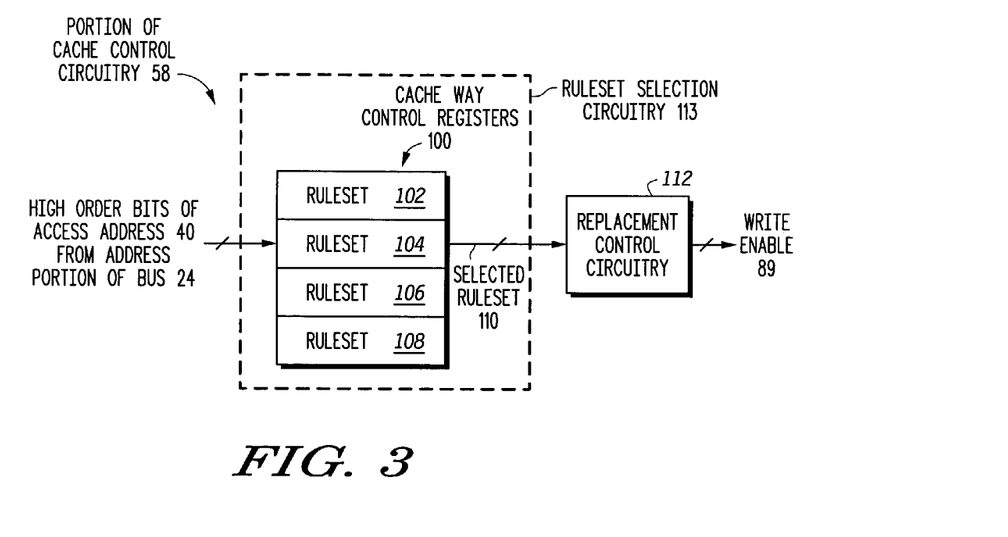
FIG. 3 illustrates, in block diagram form, a portion of the cache control circuitry of FIG. 2 in accordance with one embodiment of the present invention.

FIG. 3 illustrates one embodiment of a portion of cache control circuitry 58 of FIG. 2. The embodiment of FIG. 3 includes ruleset selection circuitry 113, which includes cache way control registers 100, and replacement control circuitry 112. Ruleset selection circuitry 113 receives the high order bits of access address 40 from the address portion of bus 24 and uses these high order bits to select one of rulesets 102, 104, 106, and 108 as selected ruleset 110. Selected ruleset 110 is then provided to replacement control circuitry which outputs write enable 89. In the illustrated embodiment, the two highest order bits of access address 40 are used to select one of four possible rulesets (102–108). However, note that in alternate embodiments, any number of higher order bits can be used to allow for a selection among a smaller or larger number of possible rulesets. For example, the three highest order bits of access address 40 may be used to select between eight (or less) possible rulesets. In one embodiment, the high order bits of access address 40 used to select a ruleset are otherwise unused address bits within cache 18 and data processing system 10. Therefore, since they are otherwise unused, they can be set to select whichever ruleset is desired for particular access addresses (as defined by the remaining bits of access address 40). For example, those addresses which correspond to predominately transient data may be assigned to a particular way of cache 18 such that only certain ways of cache 18 may store transient data. In this example, the high order bits of the addresses for transient data may be set to a value, such as 10, so as to select ruleset 106 which identifies which ways are available for that particular type of transient data. Similarly, the higher order bits of those addresses which correspond to instructions or other longer lifetime information may be set to a value, such as 00, so as to select ruleset 102 which may be used to identify which ways are available for that particular type of longer lifetime data.

Note that in alternate embodiments, there may be other bits (such as other otherwise unused bits) within the access address that may be used other than the highest order bits to select an appropriate ruleset. That is, in alternate embodiments, ruleset selection circuitry 113 may receive other portions of access address 40 to select a ruleset. Also, note that with the embodiment of FIG. 3, an existing data processing system design having unused address bits or lines may be easily retrofitted to implement the portions of cache control circuitry 58 described above with minimal additional circuitry.

Although not shown in FIG. 3, note that a decoder may be used to decode the high order bits of access address 40 to provide a selection signal to cache way control registers 100 to select the appropriate ruleset. Therefore, one of ordinary skill in the art appreciates that ruleset selection circuitry 113 may be implemented in a variety of different ways which allow a number of address bits to be used to select one of N entries.

Figure 4:
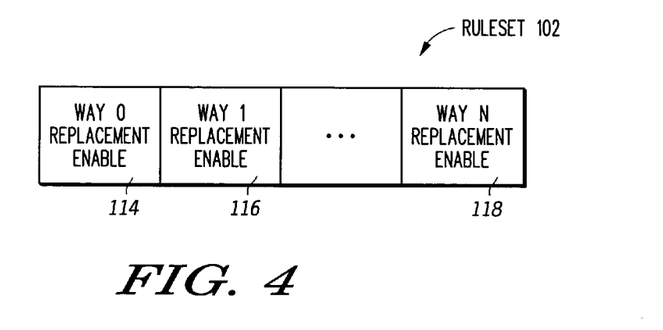
FIG. 4 illustrates, in block diagram form, a portion of the cache way control registers in accordance with one embodiment of the present invention.

FIG. 4 illustrates one example of ruleset 102, in accordance with one embodiment of the present invention. In the illustrated embodiment, ruleset 102 includes one replacement enable field for each way (0 through N) of cache 18. For example, ruleset 102 includes a way 0 replacement enable 114, a way 1 replacement enable 116, and a way N replacement enable 118. In one embodiment, each ruleset, such as ruleset 102, is stored within a user programmable register such that each bit within the ruleset is user programmable. Each replacement enable field of ruleset 102 indicates whether the corresponding way is available for replacement. That is, each replacement enable field indicates whether the corresponding way is available for storing the information that was fetched from memory in response to an access request which resulted in a miss. For example, ruleset 102 may be used to correspond to those addresses storing longer lifetime information, as described in the example of the previous paragraph. In this example, a user may wish to set aside ways 0 and 5 for use for this type of longer lifetime information, and can therefore assert the replacement enable fields for ways 0 and 5 in ruleset 102. In another example, ruleset 102 may be used to correspond to those addresses storing the shortest lifetime information within the system, meaning the user may want to allocate only one of ways 0 through N to use for this type of information. In this manner, a ruleset (such as ruleset 102) may be used to reduce cache pollution by only allocating a particular number of ways to the type of information most likely to increase cache pollution. Note that in one embodiment, each replacement enable field of ruleset 102 is a single bit to indicate whether the way is enabled or not. In an alternate embodiment, an asserted bit may indicate that a particular way is not available for replacement. Alternatively, more or fewer bits may be used, and the fields for particular ways may be combined or encoded differently.

Referring back to FIG. 3, cache way control registers 100, in one embodiment, includes a plurality of registers, one to store each of rulesets 102–108 where each ruleset may be implemented as ruleset 102 (as described above in reference to FIG. 4). Alternatively, cache way control registers 100 may include more or less registers, as needed, depending on, for example, the number and size of desired rulesets for a desired implementation. Also, in an alternate embodiment, they may not be implemented as registers but may be located in another internal or external memory. In one embodiment, the registers are user programmable so as to allow flexibility to a user so that the user may decide how to use the available rulesets and how to allocate different ways of cache 18 for different types of information. Once a particular ruleset is selected by the high order bits of access address 40, it is provided as selected ruleset 110 to replacement control circuitry 112.

Replacement control circuitry 112 determines, based on selected ruleset 110, which way is to be selected for storing the fetched information in response to the cache miss. For example, selected ruleset 110 (corresponding to one of rulesets 102–108) may indicate that more than one way is available for replacement, and therefore replacement control circuitry 112 can determine which ways are available based on selected ruleset 110, and then determine which of the available ways is to be used for the current replacement. In one embodiment, replacement control circuitry 112 may use a round robin approach to select the way, or alternatively, a least recently used approach may be used. Many other methods, as known in the art, may be used to select a way of the available ways for the replacement. Furthermore, once the way for replacement is selected, replacement control circuitry 112 can use a variety of ways, as known in the art (such as a round robin method or a least recently used method), to modify replacement state information. Once the way is selected, replacement control circuitry 112 may provide a write enable 89 to enable the selected way of data arrays 50–56. In one embodiment, write enable 89 provides one write enable signal to each way of cache 18. For example, if cache 18 includes 8 ways (e.g. 0 through 7), then write enable 89 would include 8 enable signals, one for each way. Alternatively, replacement control circuitry 112 (or other control circuitry) may encode the write enable signals to provide write enable 89. For example, if cache 18 includes 8 ways, then a 3-bit write enable 89 may be used to select one of the 8 ways. Cache control circuitry 58 is also able to access the tag arrays 42–48 as necessary to perform the replacement. Note also that in an alternate embodiment, the selected ruleset may not enable any ways for replacement or replacement control circuitry 112 may not select any way at all from the available ways.

Figure 5:
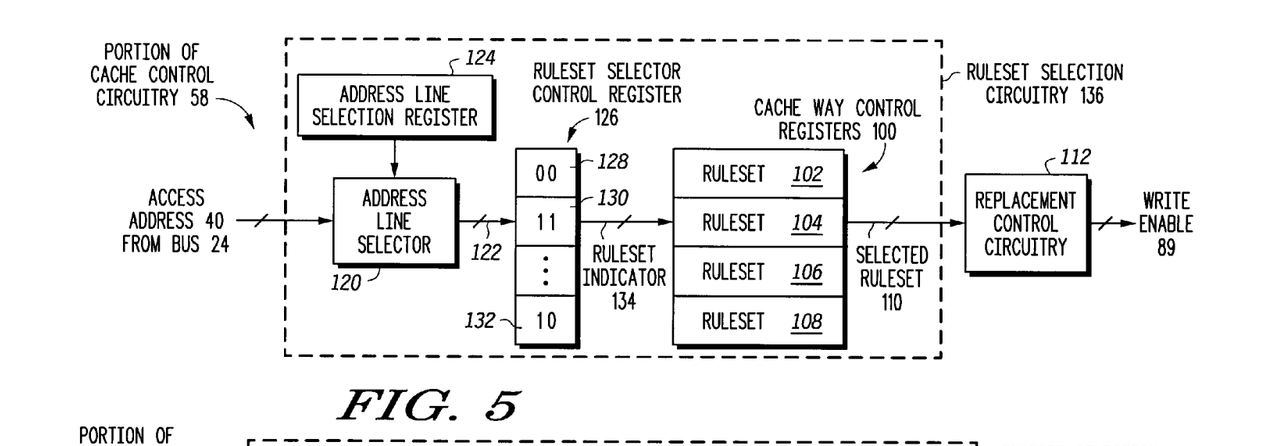
FIG. 5 illustrates in block diagram form, a portion of the cache control circuitry of FIG. 2 in accordance with an alternate embodiment of the present invention.

FIG. 5 illustrates an alternate embodiment of a portion of cache control circuitry 58. The embodiment of FIG. 5 allows a user to select a programmable ruleset based upon any subset (contiguous or not) of access address 40. The portion of cache control circuitry 58 includes ruleset selection circuitry 136, which includes address line selector 120, address line selection register 124, ruleset selector control register 126, cache way control registers 100, and replacement control circuitry 112. Address line selector 120 selects a portion of access address 40 based upon address line selection register 124 and provides the data from the selected address lines as an index into ruleset selector control register 126. Ruleset selector control register 126, which in one embodiment is a user programmable register, provides a ruleset indicator 134 to cache way control registers 100 to indicate one of rulesets 102–108. The selected ruleset is then provided as selected ruleset 110 to replacement control circuitry 112 which then provides write enable 89. Therefore, note that ruleset selection circuitry 136 receives access address 40 (or at least a portion of access address 40) and provides selected ruleset 110. Note that cache way control registers 100, including rulesets 102–108, selected ruleset 110, replacement circuitry 112, and write enable 89 operate as described above in reference to FIGS. 3 and 4 and therefore, will not be discussed in detail again in reference to the embodiment of FIG. 5.

Address line selection register 124, in one embodiment, is a user programmable register which allows a user to indicate which lines (or bits) of access address 40 to use for selecting a ruleset. Address line selector 120, based on address line selection register 124, then provides the indicated address values (from the selected bits or lines of access address 40) as an index 122 to ruleset selector control register 126. For example, in one embodiment, address line selection register 124 may have one bit for each address bit of access address 40 where if a bit of register 124 is asserted, then the corresponding address bit of access address 40 is used as part of index 122. Alternate embodiments may use other formats of address line selection register 124 which allow a user to select a subset (or all) of access address 40 as index 122. Index 122, in one embodiment, includes a minimum number of bits necessary to distinguish between each entry of ruleset selector control register 126. For example, if ruleset selector control register 126 includes only 4 or less entries, then only two bits (contiguous or not) of access address 40 are needed (thus resulting in a two-bit index 122) for addressing each entry. However, if ruleset selector control register 126 includes 8 entries, then at least three lines of access address 40 are needed (thus resulting in an at least three-bit index 122). Also note that index 122 can be derived in different ways from the selected bits of access address 40. In one embodiment, index 122 may simply be a concatenation of the selected bits or lines of access address 40. In an alternate embodiment, a decoder or other circuitry may be used to generate index 122 based on the selected bits.

Each entry (such as entries 128, 130, and 132) within ruleset selector control register 126 provides an indicator of which ruleset to select. For example, in the illustrated embodiment, if index 122 selects entry 130, then a value of "11" is provided as ruleset indicator 134 which selects ruleset 108. Therefore, in the illustrated embodiment, a value of "00" indicates ruleset 102, a value of "01" indicates ruleset 104, a value of "10" indicates ruleset 106, and a value of "11" indicates ruleset 108. In the illustrated embodiment, ruleset selector control register 126 includes entry 128 which indicates ruleset 102, entry 130 which indicates ruleset 108, and entry 132 which indicates ruleset 106. Since, in the illustrated embodiment of FIG. 5, cache way control registers 100 includes four possible rulesets, each entry of ruleset selector control register 126 includes 2 bits to select among the 4 rulesets. Note that if there were more rulesets, each entry of ruleset selector control register 126 would include more bits. Also, note that multiple entries of ruleset selector control register 126 may indicate a same ruleset. Also, note that alternate embodiments may use a different format for the entries of ruleset selector control register 126 to indicate a ruleset.

In an alternate embodiment, cache way control registers 100 may include a default ruleset (which can be either one of rulesets 102–108, or a separate ruleset) such that if index 122 does not correspond to an index of register 126, the default ruleset can be provided as selected ruleset 110. For example, if index 122 is a two bit value, but there are only three entries in ruleset selector control register 126, then one of the values of index 122 can correspond to the default ruleset. Similarly, in another example, if index 122 is a three bit value, but there are only six entries in ruleset selector control register 126, then one or two of the values of index 122 can correspond to the default ruleset.

Therefore, note that in the embodiment of FIG. 5, all or any portion of access address 40 may be used to select a ruleset, where the user is able to flexibly program which ruleset to use for given address ranges of the requested addresses by programming the values of ruleset selector control register 126. Also note that the selected bits of access address 40 may be contiguous bits or not. Note that FIG. 5 only provides one implementation, but those of ordinary skill in the art can appreciate that there a variety of ways of selecting a portion of access address 40 to select a ruleset indicator, such as ruleset indicator 134, that may be used to select a ruleset.

Figure 6:
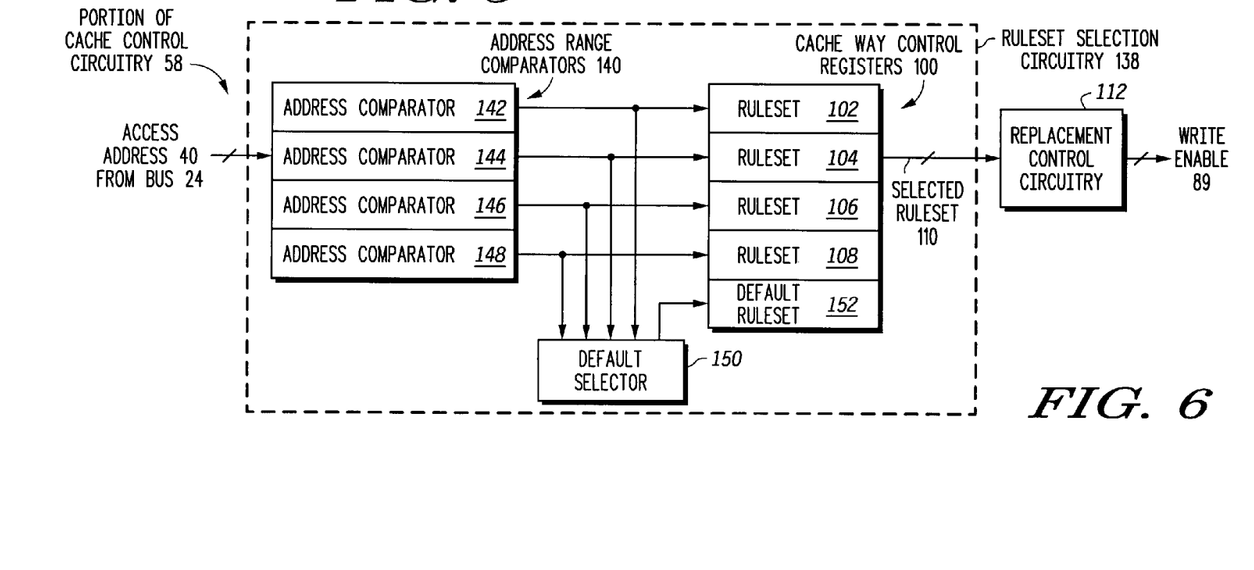
FIG. 6 illustrates in block diagram form, a portion of the cache control circuitry of FIG. 2 in accordance with an alternate embodiment of the present invention.

FIG. 6 illustrates another alternate embodiment of a portion of cache control circuitry 58. The embodiment of FIG. 6 allows a user to select a ruleset based upon all or a portion of access address 40. For example, in the illustrated embodiment, a ruleset selection circuitry 138 selects a ruleset based upon what address range, if any, access address 40 (or at least a portion of access address 40) falls within. The portion of cache control circuitry 58 of FIG. 6 includes ruleset selection circuitry 138, which includes address range comparators 140, default selector 150, and cache way control registers 100, and replacement control circuitry 112. Address range comparators 140 and default selector 150 are used to select one of rulesets 102–108 or default ruleset 152. If access address 40 falls within one of the address ranges defined by any one of address comparators 142–148, then one of rulesets 102–108 is selected. However, if access address 40 does not fall within one of the address ranges defined by any of address comparators 142–148, then default ruleset 152 is selected. (Note that in one embodiment, default ruleset 152 is an additional ruleset, in addition to rulesets 102–108, but, in an alternate embodiment, default ruleset 152 may be one of rulesets 102–108.) The selected ruleset is then provided as selected ruleset 110 to replacement control circuitry 112 which then provides write enable 89. Note that cache way control registers 100 (except for default ruleset 152), selected ruleset 110, replacement circuitry 112, and write enable 89 operate as described above in reference to FIGS. 3 and 4 and therefore, will not be discussed in detail again in reference to the embodiment of FIG. 6.

Address range comparators 140 determine in which address range, if any, access address 40 falls into. For example, each of address comparators 142–148 may be used to define an address range. In one embodiment, each of address comparators 142–148 includes circuitry to store a starting address and an ending address of the corresponding range and comparison circuitry to compare access address 40 to the starting and ending address to determine if it falls within that range. Alternatively, each of address comparators 142–148 may include circuitry to store a base address (to define the starting address of an address range) and a mask value (to define a range from the base address) and comparison circuitry to compare access address 40 masked by the mask value to the based address masked by the mask value to determine if it falls within that range. Each range therefore indicates a corresponding ruleset. For example, in the illustrated embodiment of FIG. 6, if access address 40 falls within the address range defined by address comparator 142, then ruleset 102 is indicated. If access address 40 falls within the address range defined by address comparator 144, then ruleset 104 is indicated. If access address 40 falls within the address range defined by address comparator 146, then ruleset 106 is indicated. If access address 40 falls within the address range defined by address comparator 148, then ruleset 108 is indicated.

If access address 40 does not fall in any of the ranges defined by address range comparators 140, then default selector 150 selects default ruleset 152. For example, in one embodiment, default selector 150 may monitor to see if none of the indicators coupled between the address range comparators 140 and cache way control registers 100 are asserted and then, in response, asserts its output indicator to select default ruleset 152. Default ruleset 152 can be similar in form and function to the other rulesets, such as ruleset 102 of FIG. 4. Note also that default ruleset 152 is optional. For example, all the ranges can be defined such that access address 40 will always fall into a range. Note that alternate embodiments may include any number of address ranges, as needed. Furthermore, note that multiple address ranges may correspond to a same ruleset. In one embodiment, each of the ranges are non-overlapping. However, in alternate embodiments, they may overlap.

Therefore, address ranges may be set up by address range comparators 140 to indicate different types of information such that the rulesets may be used to enable different ways of cache 18 depending on the type of information within the address range. For example, for streaming data, the address range of addresses storing streaming data can be indicated by address comparator 146 such that if access address 40 falls within that range, streaming data is indicated, and thus, ruleset 106 is selected having those ways which are enabled (i.e. available) to store the streaming data. Therefore, a user has flexibility in defining which address ranges correspond to which ways of cache 18, and thus can use this flexibility to improve cache performance and reduce cache pollution.

Note that the above embodiments were described in reference to selecting a ruleset to indicate available ways within cache 18 for replacement in response to a read access which resulted in a miss. However, note that in alternate embodiments, the methods described above may be used to select a ruleset to indicate available ways within a cache for replacement for other operations, such as, for example, for prefetching, which may be done in response to hits, or misses, or both, as known in the art.

Therefore, it can be appreciated how different implementations of a ruleset selection circuitry (such as ruleset selection circuitries 113, 136, and 138) can be used to select a ruleset based upon at least a portion of an access address. In each embodiment, the rulesets can be designed in order to improve cache performance and reduce cache pollution by, for example, allocating different cache ways to different types of information. For example, in one application, a user can allocate different cache ways depending on the lifetime of the information such that shorter lifetime information does not replace (or overly replace) longer lifetime information. Alternatively, different attributes (other than or in addition to the lifetime) of information may be used for allocating different cache ways. Furthermore, the programmability of portions of the ruleset selection circuitry, such as, for example, cache way control registers 100, ruleset selector control register 126, address range comparators 140, etc., allow for a user to optimize the cache (such as cache 18) for different types of applications. Also, the embodiments of FIGS. 5 and 6 allow for any number of rulesets and address ranges to be defined as needed with minimal overhead. Rulesets can also be reprogrammed at any time, as needed, including during the execution of tasks or threads. Furthermore, the optimizations can be performed without the need of allocating special software instructions and without additional software execution overhead. Also, the memory management unit does not need to have knowledge relating to the type of information stored in different memory regions.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. In a cache having a plurality of ways, a method for selecting N ways available for replacement, comprising:
   providing a plurality of rulesets, wherein each one of the plurality of rulesets specifies N ways in the cache that are available for replacement, wherein N is an integer equal to or greater than zero;
   receiving an access address;
   using at least a portion of the access address to select a selected one of the plurality of rulesets; and
   using the selected one of the plurality of rulesets, selecting N ways in the cache that are available for replacement.

2. A method as in claim 1, wherein the least a portion of the access address comprises a plurality of contiguous access address bits.

3. A method as in claim 1, further comprising:
   providing a first programmable bit to enable replacement of a first one of the plurality of ways.

4. A method as in claim 3, further comprising:
   providing a second programmable bit to enable replacement of a second one of the plurality of ways.

5. A method as in claim 4, wherein a first one of the plurality of rulesets comprises the first and second programmable bits.

6. A method as in claim 5, further comprising:
   providing a third programmable bit to enable replacement of the first one of the plurality of ways; and
   providing a fourth programmable bit to enable replacement of the second one of the plurality of ways, wherein a second one of the plurality of rulesets comprises the third and fourth programmable bits.

7. A method as in claim 1, wherein the at least a portion of the access address comprises a plurality of bits, and wherein the plurality of bits comprises a highest order bit of the access address.

8. A method as in claim 1, wherein the at least a portion of the access address has no further use in the cache.

9. A method as in claim 1, further comprising:
selecting a plurality of bits of the access address to use as the at least a portion of the access address.

10. A method as in claim 1, further comprising:
decoding the at least a portion of the access address, wherein said step of decoding is performed before said step of using at least a portion of the access address to select a selected one of the plurality of rulesets.

11. A method as in claim 1, further comprising:
providing a ruleset selection control register which receives the at least a portion of the access address and which provides a ruleset indicator for selecting at least one of the plurality of rulesets.

12. A method as in claim 1, further comprising:
providing a first address range corresponding to a first one of the plurality of rulesets; and
determining if the access address is within the first address range.

13. A method as in claim 12, further comprising:
providing a second address range corresponding to a second one of the plurality of rulesets; and
determining if the access address is within the second address range.

14. A method as in claim 13, further comprising:
if the access address is not within the first address range and is not within the second address range, using a default ruleset from the plurality of rulesets.

15. A method as in claim 1, wherein the cache is formed as a portion of an integrated circuit.

16. An integrated circuit comprising a cache having a plurality of ways, the cache comprising:
ruleset selection circuitry comprising ruleset storage circuitry for storing a plurality of rulesets, wherein each one of the plurality of rulesets specifies N ways in the cache that are available for replacement, wherein N is an integer equal to or greater than zero, the ruleset selection circuitry uses at least a portion of an access address to provide at least one selected ruleset signal; and
replacement control circuitry, coupled to the ruleset selection circuitry to receive the at least one selected ruleset signal, the replacement control circuitry uses the at least one selected ruleset signal to select N ways in the cache that are available for replacement.

17. An integrated circuit as in claim 16, wherein the ruleset selection circuitry further comprises:
first storage circuitry for storing one of a base address value and a lower bound value; and
second storage circuitry for storing one of a mask value and an upper bound value.

18. Cache control circuitry, comprising:
storage circuitry for storing a plurality of rulesets;
circuitry coupled to said storage circuitry, wherein said circuitry uses a portion of an access address to generate a ruleset indicator, said ruleset indicator being used to select at least one of the plurality of rulesets, and
wherein said one of the plurality of rulesets is used to select at least zero or more ways in the cache that are available for replacement.

19. The cache control circuitry of claim 18, wherein said storage circuitry comprises at least one user programmable control register.

* * * * *